Figure 1:
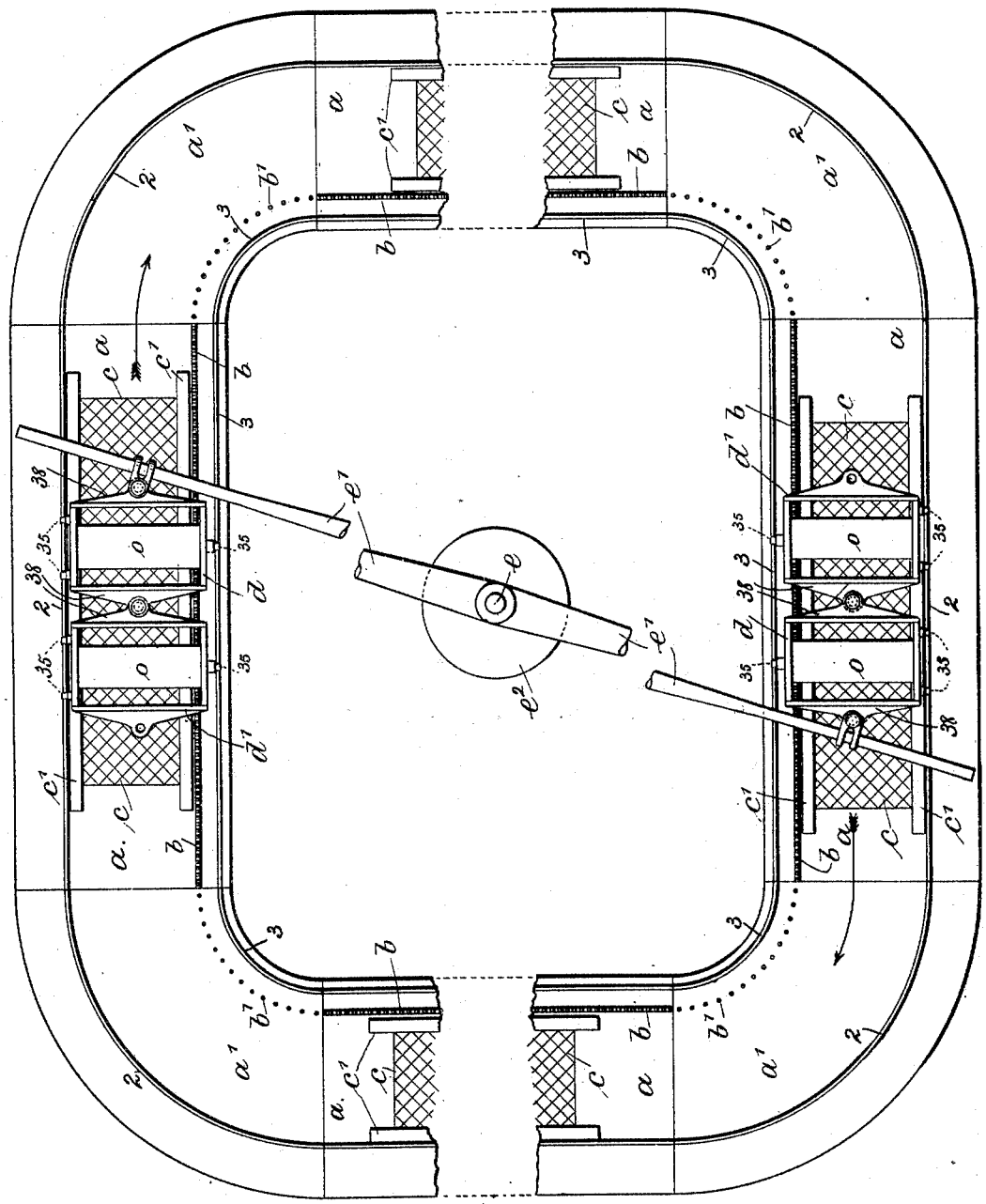

No. 759,106. PATENTED MAY 3, 1904.
H. VAN C. HOLLAND.
MACHINE FOR THE MANUFACTURE OF INLAID LINOLEUM.
APPLICATION FILED NOV. 25, 1903.
NO MODEL. 7 SHEETS—SHEET 1.

No. 759,106. PATENTED MAY 3, 1904.
H. VAN C. HOLLAND.
MACHINE FOR THE MANUFACTURE OF INLAID LINOLEUM.
APPLICATION FILED NOV. 25, 1903.
NO MODEL. 7 SHEETS—SHEET 2.
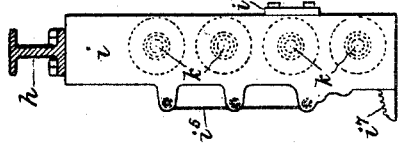
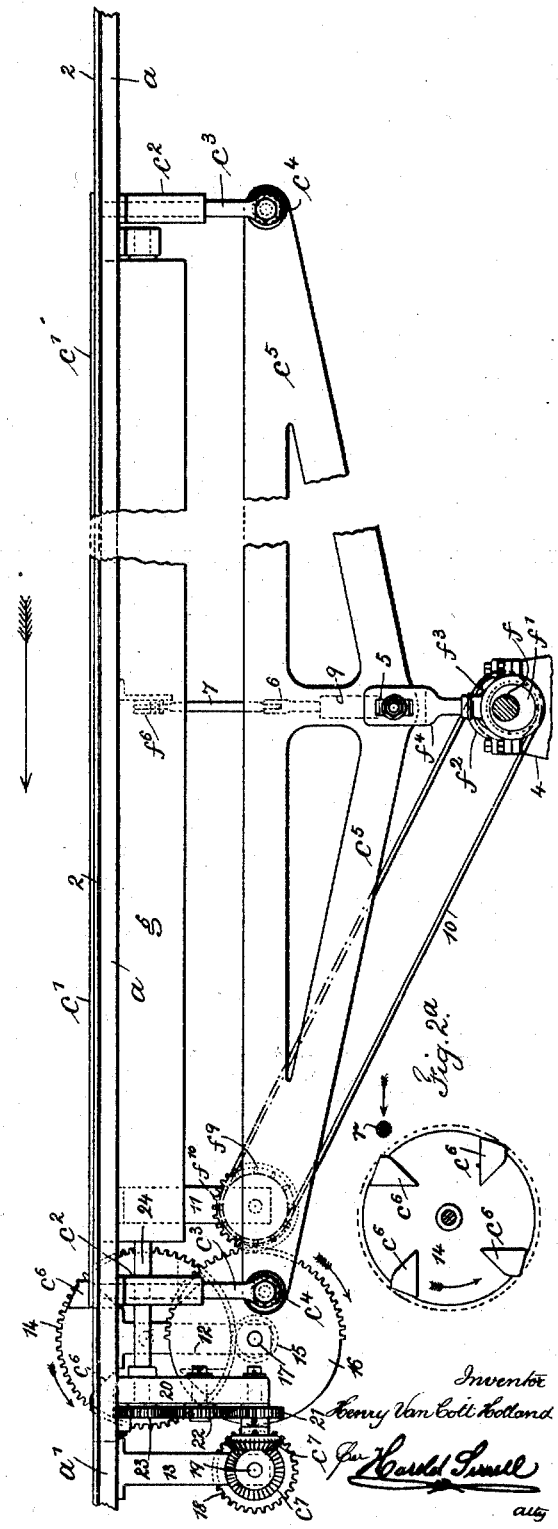

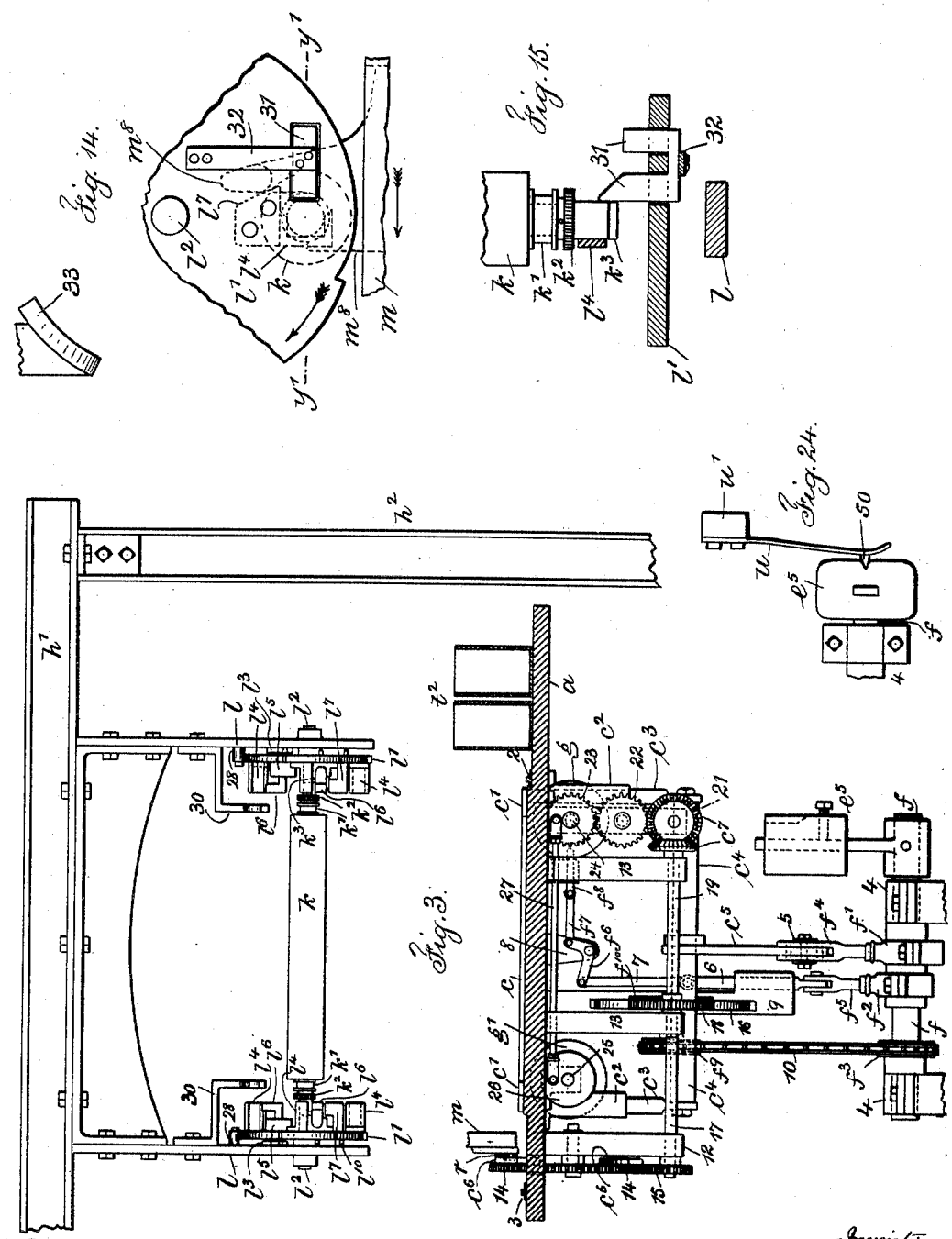

No. 759,106. PATENTED MAY 3, 1904.
H. VAN C. HOLLAND.
MACHINE FOR THE MANUFACTURE OF INLAID LINOLEUM.
APPLICATION FILED NOV. 25, 1903.
NO MODEL. 7 SHEETS—SHEET 4.
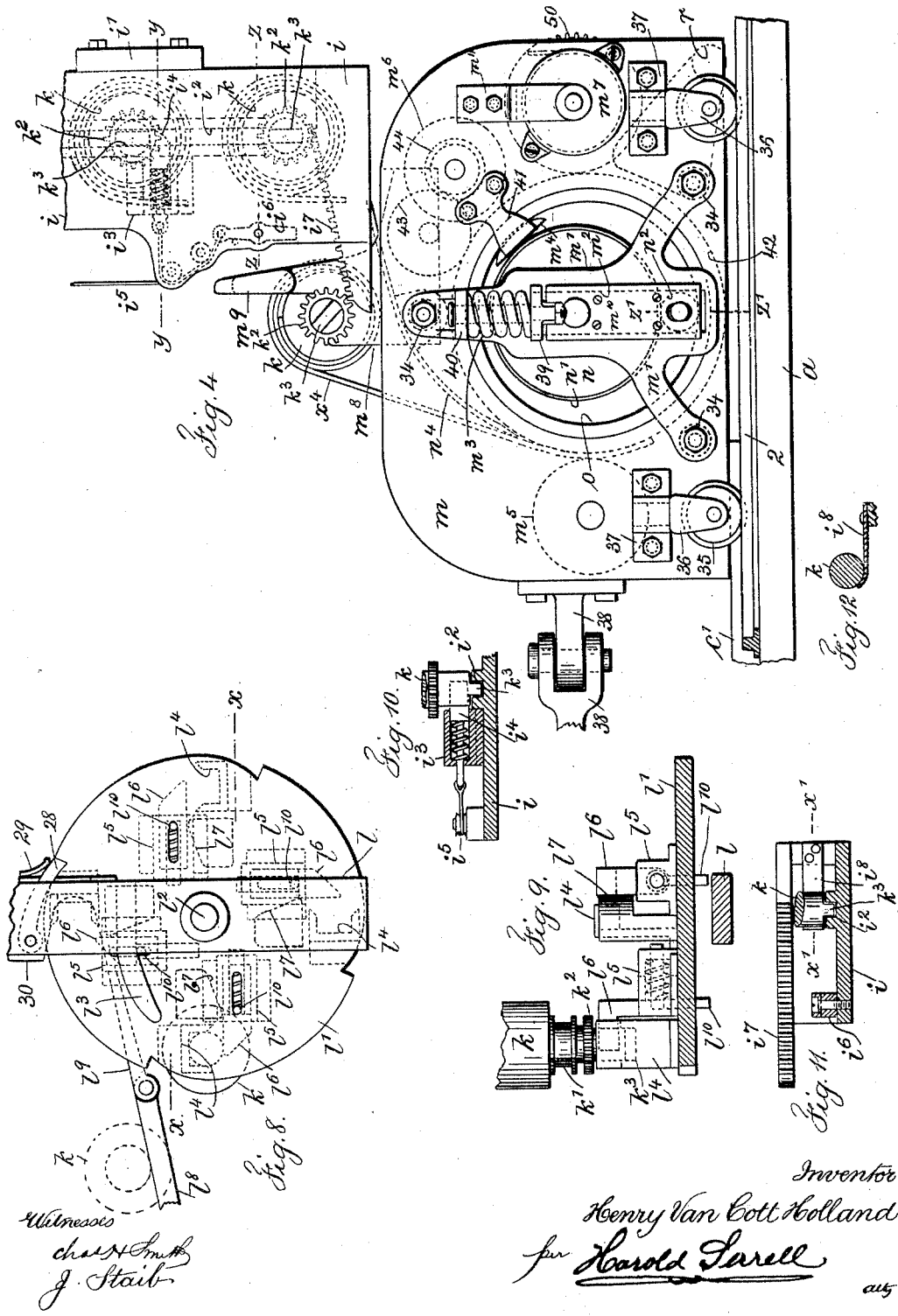
Inventor
Henry Van Cott Holland
per Harold Sarell
atty
Witnesses
Chas H Smith
J. Staib No. 759,106. PATENTED MAY 3, 1904.
H. VAN C. HOLLAND.
MACHINE FOR THE MANUFACTURE OF INLAID LINOLEUM.
APPLICATION FILED NOV. 25, 1903.
NO MODEL. 7 SHEETS—SHEET 5.

Witnesses
Chas H Smith
J. Staib

Inventor
Henry Van Cott Holland
per Harold Serrell
atty

No. 759,106. PATENTED MAY 3, 1904.
H. VAN C. HOLLAND.
MACHINE FOR THE MANUFACTURE OF INLAID LINOLEUM.
APPLICATION FILED NOV. 25, 1903.
NO MODEL. 7 SHEETS—SHEET 6.
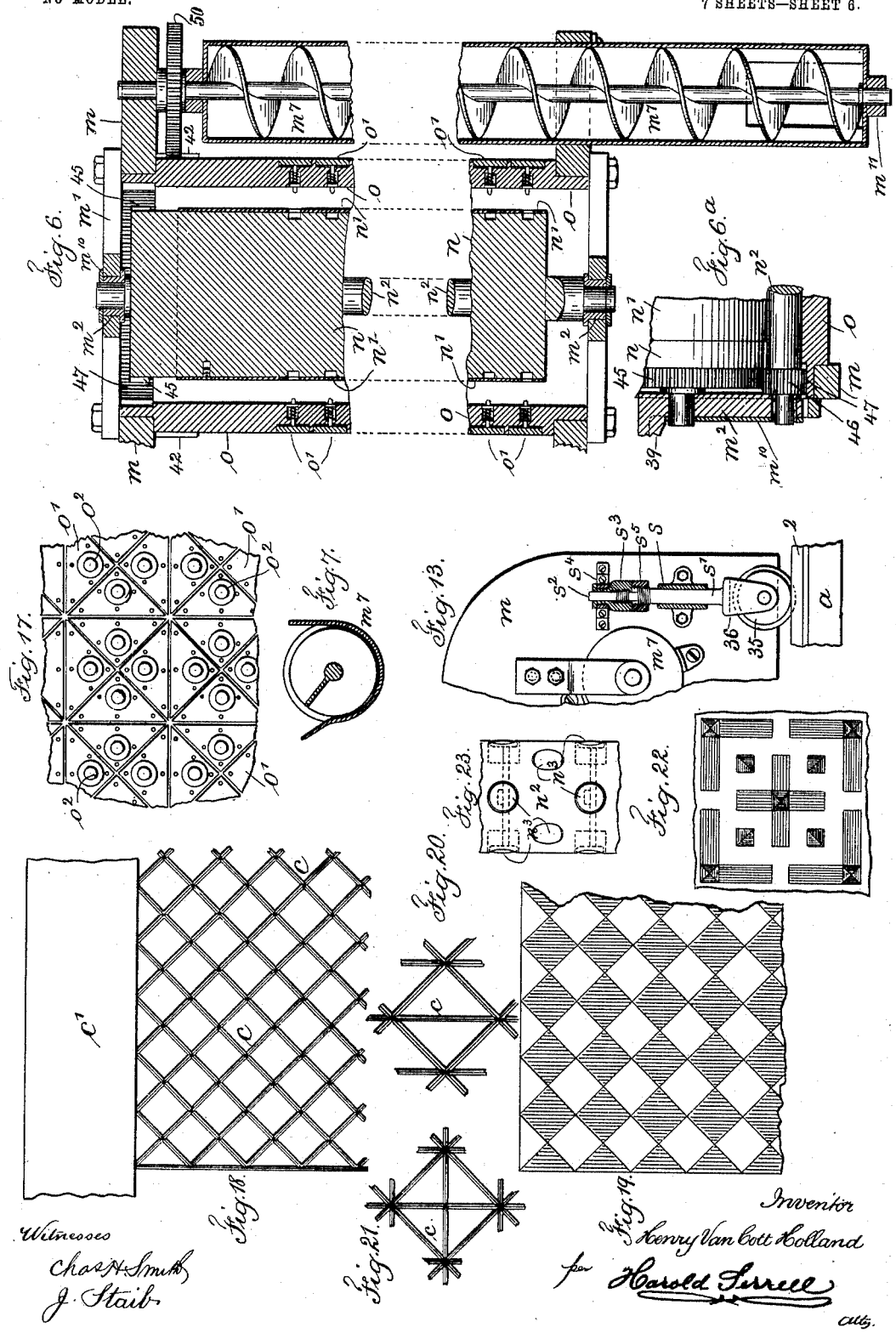

No. 759,106. PATENTED MAY 3, 1904.
H. VAN C. HOLLAND.
MACHINE FOR THE MANUFACTURE OF INLAID LINOLEUM.
APPLICATION FILED NOV. 25, 1903.
NO MODEL. 7 SHEETS—SHEET 7.
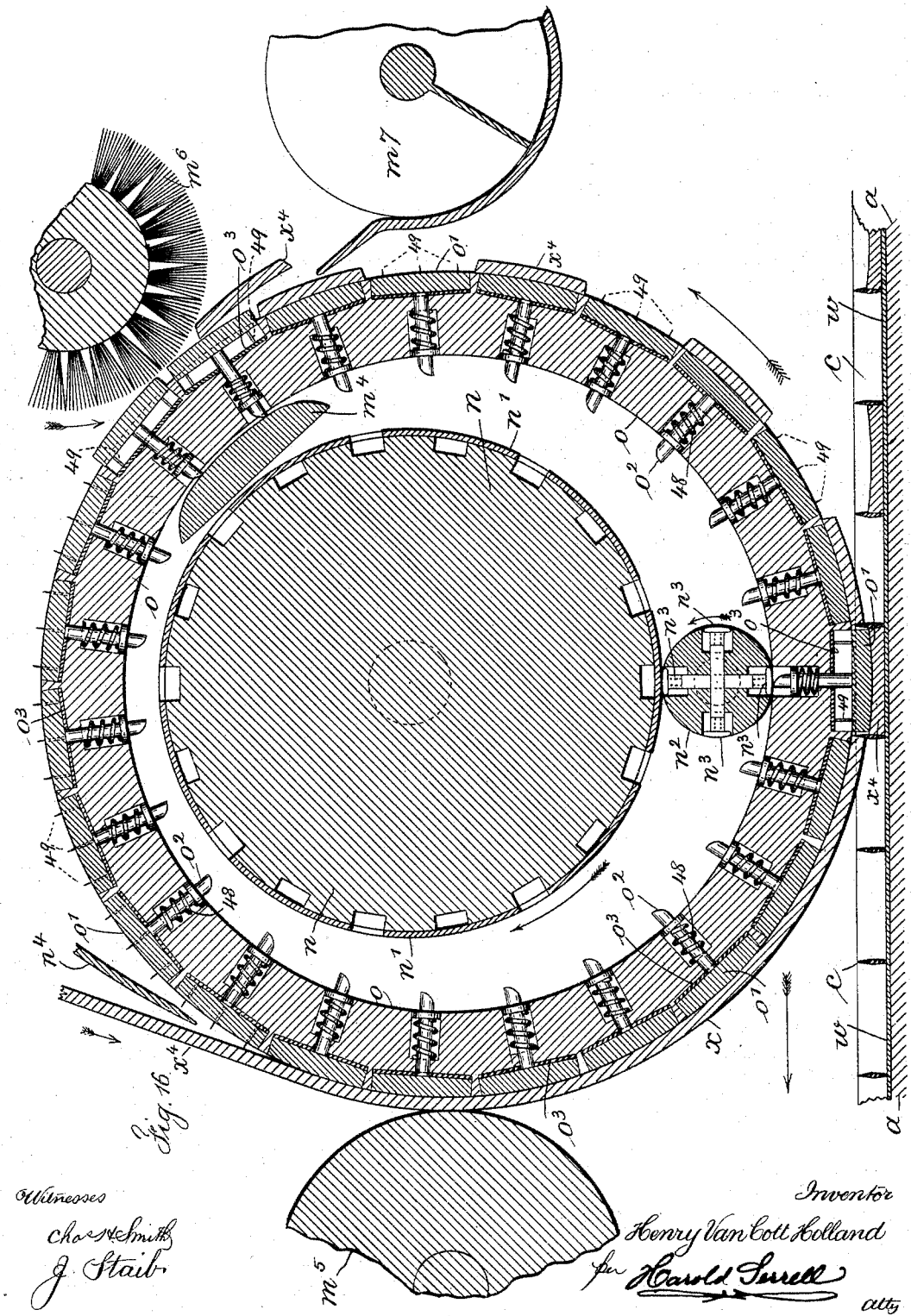

No. 759,106.

Patented May 3, 1904.

UNITED STATES PATENT OFFICE.

HENRY VAN COTT HOLLAND, OF NEW YORK, N. Y.

MACHINE FOR THE MANUFACTURE OF INLAID LINOLEUM.

SPECIFICATION forming part of Letters Patent No. 759,106, dated May 3, 1904.

Application filed November 25, 1903. Serial No. 182,579. (No model.)

*To all whom it may concern:*

Be it known that I, HENRY VAN COTT HOLLAND, a citizen of the United States, residing in the borough of Brooklyn, in the county of Kings, city and State of New York, have invented an Improvement in Machines for the Manufacture of Inlaid Linoleum, of which the following is a specification.

My invention relates to improvements in devices employed in the manufacture of that class of floor-cloth known as "inlaid linoleum" and to like fabrics in which the colors of the design are continuous through the composition material employed and in which such material is cut out and applied in pieces or tesseræ of predetermined shapes to fabric to make up the pattern of the finished article, the object of my invention being to provide an improved machine for the manufacture of this class of goods.

In the device of my invention the pattern is laid the full width of the cloth in progressive sections lengthwise of the cloth, and the devices are so arranged that several lengths of linoleum floor-cloth are being simultaneously produced in a given pattern employing like or different colors by a series of continuously-moving devices. These devices are duplicates and are arranged about an endless platform of opposite parallel parts and intermediate parts at right angles thereto forming an endless series, and the movable parts are traveling cars conveying the plastic sheet material, which is progressively fed and cut up into tesseræ according to the predetermined pattern-plate and deposited on the fabric strip as cut, unused pieces being extruded and removed by conveyers to be repressed into sheet form for further use.

In my improvement each cutting pattern-plate occupies a horizontal position and is in a plane parallel to the platform upon which it rests and its only movement is vertical to provide for shifting each inlaid linoleum section as completed—that is, each section of backing fabric on which has been placed the pieces of tesseræ going to make up the fabric. The power is applied to move the several cars and by their movement power is communicated to devices to actuate the other parts of the machine. A hopper device receives rolls of plastic composition employed and these are automatically and progressively delivered to the cars as moved along, and there is a device for automatically receiving the empty spools after the removal of the material. As the cars are moved along a filling-cylinder carried by each car and parts associated therewith press the plastic material into the pattern-plate, this act performing the cutting and producing the tesseræ, and the pattern of the goods is produced by the presence or absence of cutting-bars of the pattern-plate and devices of and associated with the filling-cylinder.

The filling-cylinder is preferably so constructed with series of spring-controlled die-plungers as to be adapted for any pattern desired, as hereinafter described. Each design necessitates only a new pattern-plate and matrix-roller, which is comparatively inexpensive. My improvement is essentially an assembling-machine in the process of manufacturing inlaid linoleum and is a device intermediate of the machine for preparing the composition material and the machine for pressing the tesseræ firmly to the fabric and completing the linoleum goods.

In the device of my improvement the parts are so constructed, arranged, timed, and controlled that all necessity of register in the goods is obviated.

Figure 5:
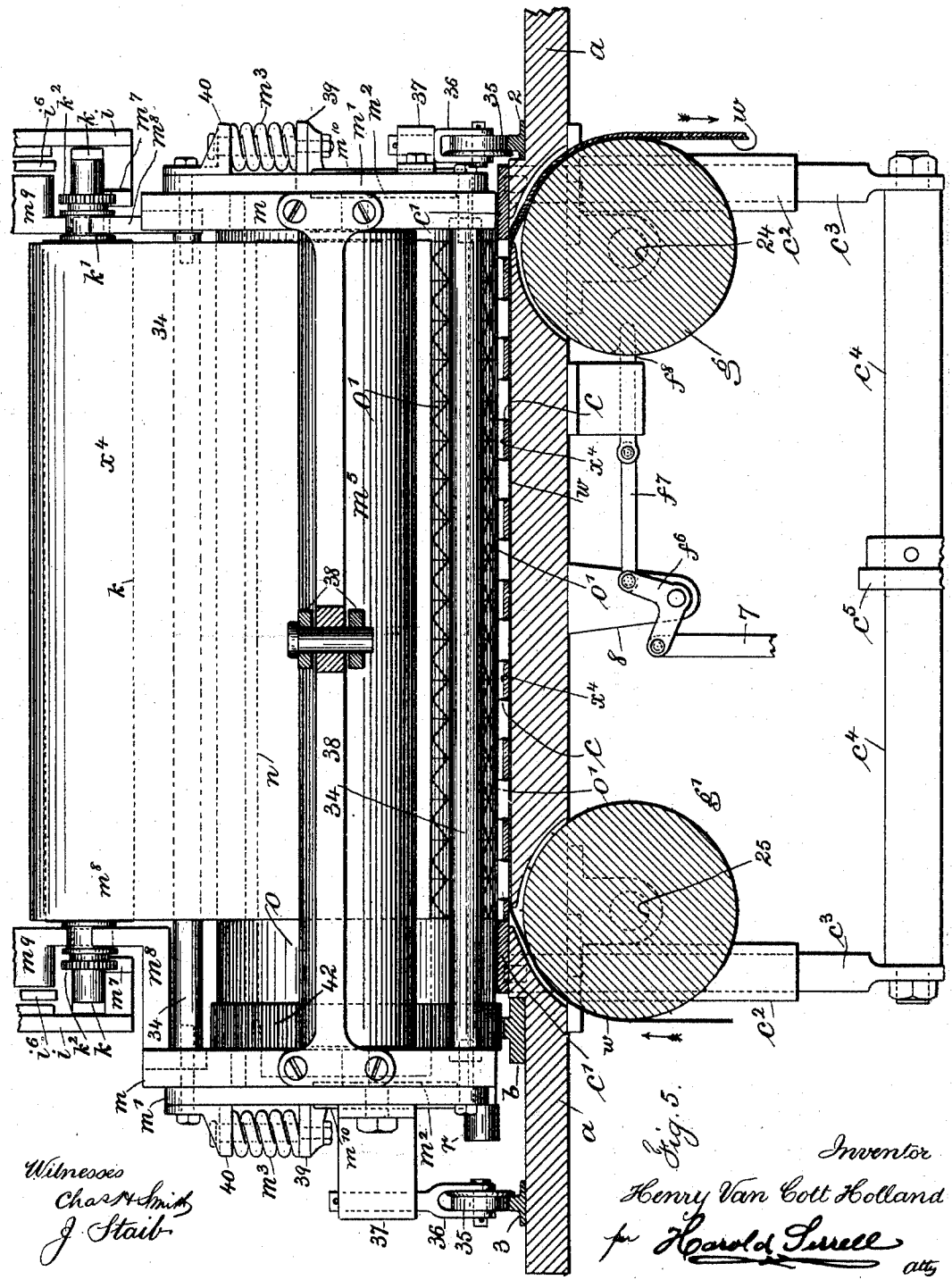

In the drawings, Figure 1 is a diagrammatic plan of the series of devices entering into my improvement. Fig. 2 is a side elevation of the correlated working parts of each cutting-table. Fig. 2ª is an elevation of the large gear shown in Fig. 2. Fig. 3 is an end elevation and section of the parts shown in Fig. 2 from the left-hand end. Fig. 4 is a side elevation of one of the cars and a portion of the loading device or receptacle for the stock of spools and plastic material. Fig. 5 is a cross-section through the platform and an elevation of the car shown in Fig. 4 from the left-hand end. Fig. 6 is a horizontal section of part of the car. Fig. 6ª is a vertical section at the dotted line $z'\ z'$ of Fig. 4. Fig. 7 is a cross-section of the conveyer at the open part for pieces shown in Fig. 6. Fig. 8 is an end elevation of the devices for taking off the empty spools, and which part is shown generally in Fig. 2. Fig. 9 is a sectional plan at the dotted line $x\,x$ of Fig. 8. Fig. 10 is a horizontal section at the dotted line $y\,y$ of Fig. 4. Fig. 11 is a horizontal section at the dotted line $z\,z$ of Fig. 4. Fig. 12 is a cross-section at the dotted line $x'\,x'$ of Fig. 11, Figs. 9, 10, and 11 being taken only at one end of the apparatus. Fig. 13 is an elevation of a modification of the roller device, Fig. 4, for supporting the car and illustrating the preferred form of structure. Fig. 14 is an elevation of a modification of the device for receiving and locking the empty spools to the spool-carrier. Fig. 15 is a sectional plan at the dotted line $y'\,y'$ of Fig. 14 of the parts therein shown. Fig. 16 is a cross-section in full size of the pattern-die or filling-cylinder, the pattern and plunger rollers, and adjacent and coöperating parts. Fig. 17 is a plan of the backs of a series of the die-plungers. Fig. 18 is a plan of the pattern-cutting plate. Fig. 19 is a plan of a portion of finished linoleum made with the pattern-plate of Fig. 18, and Figs. 20 and 21 are partial plans showing modifications of said pattern-plate. In the drawings Figs. 4 to 15, inclusive, are on the same scale. Figs. 16 and 17 are drawn full size, while Figs. 18 and 19 are on the same scale. Fig. 22 is a plan of a portion of finished linoleum, illustrating a pattern that may be made with the machine. Fig. 23 is a plan of a part of the plunger-roller, and Fig. 24 is a spring-retaining device for the counterbalance-weight.

Referring to the diagrammatic plan, Fig. 1, $a$ represents a series of four working platforms in pairs and the pairs at right angles to one another. These are connected by platforms $a'$ of quarter-circle configuration, the series substantially being arranged as a square with rounded corners. This arrangement of platforms provides for progressive operations upon four pieces of fabric. On these platforms, 2 3 represent endless tracks, the track 3 near the inner edge and the track 2 of greater circumference and adjacent to the outer edge. On the platforms $a\,a'$ there are the series of racks $b$, each of a length agreeing with the length of the working platforms $a$, and between the respective ends of these racks and arranged in curved form on the connecting-platforms are series of pins $b'$. These platforms may be supported by a framing or foundation in any desired manner.

$c$ represents the cutting pattern-plates also shown in Figs. 3, 5, 16, and 18. These are each composed of a series of bars tapered from the center toward the respective surfaces, the upper portions being brought to cutting edges. In the drawings these pattern-plates represent a series of squares and divided squares or triangular forms in outline, because the pattern of the goods to be produced is controlled by the presence or absence of cutting-bars of the pattern-plate. Each of these pattern-plates is provided with side frames $c'$.

In the diagrammatic plan, Fig. 1, $d\,d'$ represent cars with wheels on the track-rails 2 3, the arrow showing the direction of travel. $e$ is a power-shaft having a pulley $e^2$, by which rotation is imparted to the shaft and a beam $e'$ above the cars and adapted for drawing along either a single car or any number of cars that are pivotally connected together and are running upon the track, there being, by preference, a yoke connection between said beam $e'$ and the pin of the forward car. The horizontal position of this beam $e'$ will be apparent from Fig. 4, and the same comes between the platform and the correlated and supported devices shown in Fig. 2. As the parts are duplicates around this platform, the description of one will necessarily answer for all.

Referring especially to Figs. 2, 3, and 5, $c^2$ represents sleeves secured to the under surface of the platform $a$ below the respective ends of the side frames $c'$. $c^3$ represents vertical arms passing through these sleeves, at their upper ends connected to the ends of the side frames $c'$ and at their lower ends pivotally connected to the ends of cross-beams $c^4$. There are therefore four sleeves $c^2$ and arms $c^3$ and two cross-beams $c^4$. A brace-beam $c^5$ is secured at about the central portion of the cross-beams $c^4$. A shaft $f$ is at its ends supported in bearings 4. (See Figs. 2 and 3.) This shaft $f$ carries eccentrics $f'\,f^2$ adjacent to one another, a sprocket $f^3$, and a counterweight $e^5$.

Connected to the eccentric $f'$ is a sliding upright $f^4$, which at its upper end straddles the lower end of the brace-beam $c^5$ and is connected thereto by a bolt and bearing-blocks 5, the bearing-blocks being of less length than the slots in the forked end of the upright $f^4$, thus providing for an appreciable lost motion to be sure that the cutting pattern-plate $c$ and frames $c'$ drop by gravity upon the platform $a$. There is an upright $f^5$ connected to the eccentric $f^2$, and connecting-rods 6 7, pivoted together, are at the lower end of the rod 6 connected to the upright $f^5$ and at the upper end of the rod 7 to the bell-crank lever $f^6$. The rod 6 is vertically slidable in a guide 9, and the bell-crank lever is pivotally connected to a bracket 8. There is a link $f^7$ at one end connected to the bell-crank lever $f^6$ and at its other end to a locking-pin $f^8$, which locking-pin moves through a guide, its free end entering an aperture in the roller $g$, hereinafter described. A chain 10 passes around the sprocket $f^3$ of the shaft $f$ and also around a sprocket $f^9$ upon a short shaft secured to a bracket-arm 11. On this short shaft is a gear $f^{10}$. (See Figs. 2 and 3.)

There are sets of bracket-arms 12 and 13 (see Figs. 2 and 3) adjacent to the bracket-arm 11 and coming close to the left-hand end of each working platform $a$ and the right-hand end of each adjacent connecting platform $a'$, the union of said two parts being shown in Fig. 2, and all of said bracket-arms being secured to the under surface of the working and connecting platforms $a$ $a'$ and depending therefrom for the support of shafts.

14 represents a large gear on a short shaft secured to a bracket-arm 12, a part of said gear projecting through the platform $a$. On the surface of the large gear 14 nearest to the center of the platform are a series of equidistant spaced-apart segmental blocks $c^6$, (see Fig. 2$^a$,) the purpose of which is hereinafter described. This gear 14 meshes with a pinion 15 on the shaft 17 in bearings in the lower ends of the bracket-arms 12. On the opposite end of the shaft 17 there is a large gear 16 with teeth on the surface thereof for half the circumference only, and this large gear 16 meshes with the gear $f^{10}$. (See Fig. 2.) There is a gear 18 on a shaft 19 in bearings in the lower ends of the bracket-arms 13, the teeth of which gear 18 mesh with the teeth of the large gear 16 for each half-revolution of the said large gear 16, the gear 18 remaining in a state of rest for the other half-revolution of the gear 16. A bracket-arm 20 is also connected to and depends from the under surface of the platform $a$, and to this bracket-arm are connected the short hubs of the meshing gears 21 22. The shaft of the gear 21 and the shaft 19 are connected by bevel-gears $c^7$. Therefore the movement of the gear 14 is communicated to the pinion 15, shaft 17, gear 16, gear $f^{10}$, its sprockets and chain, to communicate a rotary movement to the shaft $f$ and by means of the eccentric $f'$ of said shaft to raise and lower the brace-beam $c^5$, cross-beams $c^4$, the arms $c^3$, and the cutting pattern-plate $c$. This large gear 16 when meshing with the gear 18 imparts rotation to the shaft 19, the bevel-wheels $c^7$, the gears 21 and 22, and also to a gear 23, which meshes with the gear 22 and which latter gear is on a shaft 24. This shaft 24 is provided with suitable bearings, and mounted on said shaft is a long roller $g$ (see Figs. 2, 3, and 5) and which roller runs parallel with the working platform $a$ along one edge. Along the other edge of the platform is a corresponding roller $g'$, mounted upon a shaft 25 in suitable bearings, one end of which shaft is provided with a disk 26. There is a connecting-rod 27 at its ends pivotally connected to the disk 26 and to the gear 23, whereby the movement imparted to the roller $g$ by means of the gears 21, 22, and 23 is likewise communicated by the disk 26 and shaft 25 to the roller $g'$, so that the rollers $g$ $g'$ turn in unison.

Parallel vertical planes passed through the axes of the rollers $g$ $g'$ are separated by a distance that approximately agrees with the width of the cutting pattern-plate $c$, and over these rollers and through openings in the working platform and across the surface of the working platform beneath the cutting pattern-plate $c$ extends the fabric $w$, upon which the composition material tesseræ is progressively laid for manufacturing the linoleum. (See Fig. 5.)

Referring to Figs. 2 and 3, $h$ $h'$ are beams suitably carried or supported by columns $h^2$, which occupy positions around and outside of the series of working and connecting platforms. These beams $h$ $h'$ support the storage device for the rolls of composition material to be cut up and the receptacle for empty spools, the storage device, as will be seen from Fig. 2, coming at the right-hand end of a working platform and the receptacle for empty spools adjacent to the left-hand end, Fig. 3 showing an elevation of this receptacle with an empty spool in position.

The structure for the storage of rolls comprises side frames $i$, connected at the back by a brace $i'$ and at the top to and by the beam $h$. The inner surfaces of the frames $i$ are provided with vertical grooves $i^2$ and at their lower ends with inclined racks $i^7$, the grooves stopping short of the upper and highest surfaces of the racks a distance equal to the diameter of the shaft of the roller or spool $k$, around which is wrapped the composition material from which the tesseræ are cut. The shaft of each roller or spool $k$ is at its respective ends grooved for friction-rollers $k'$ and provided with gears $k^2$ and with lug ends $k^3$ of a width adapted to be received and slide vertically in the grooves $i^2$ of the side frames $i$. The lug ends $k^3$ in the grooves $i^2$ are so arranged that the teeth of the gears $k^2$ when down will always mesh with the teeth of the rack $i^7$, thus avoiding any interference of the teeth.

Upon the inner surfaces of the side frames $i$ at predetermined intervals vertically are cases $i^3$, in which are spring-catches $i^4$, and from each catch there extends a cord $i^5$ over rollers at the left-hand edge of the storage for rolls, said cords extending down to and connecting with latches $i^6$. (See Fig. 4.) I provide at the lower end of each side frame $i$ and off at one side from the inclined racks $i^7$ springs $i^8$, (see Figs. 11 and 12,) the free ends of which are slightly bent. These springs act as temporary seats for the ends of the shaft or spindle of the roller $k$ in the position of the same in Figs. 4, 11, and 12. The operation of these parts is hereinafter described.

The receptacle for the empty spools comprises end disks $l'$ and a shaft $l^2$, pivotally mounted in side frames $l$, connected to and suspended from the beam $h'$. (See Figs. 2 and 8.) These end disks $l'$ are provided with peripheral notches, four in number, as shown, equally spaced apart to be engaged by pawls 28, and which pawls are held in an initial position of engagement by springs 29. The pawls are pivoted to the side frames $l$, and the springs 29 are also secured thereto and act to hold the pawls in engagement with the notches of the end disks $l'$.

Cams $l^3$, Fig. 8, are secured to opposite sides of the frames $l$ for the performance of the functions hereinafter described. Upon the inner surfaces of the end disks $l'$ are placed U-shaped receptacles $l^4$, the apertures of which are of an area adapted to receive the ends of the shafts or spindles of the rollers $k$. Adjacent to these receptacles are latch-cases $l^5$ in which are spring-latches $l^6$ of peculiar form—that is to say, each latch is provided with a pin $l^{10}$, projecting through a slot in the end disk $l'$ and with a portion that extends through the latch-case and with an end that projects over the opening of the U-shaped receptacle, so that when the ends of the roller-spindle are received by the U-shaped apertures the end of the spring-latch comes over said spindle and retains the ends in place. Adjacent to these latch-cases and also secured to the end disks $l'$ are inclined bracket-lugs $l^7$, and extending toward the receptacle for empty spools is an inclined way $l^8$ with pivoted ends $l^9$, which pass between the end disks $l'$.

The side frames $l$ are provided with adjustable bracket-arms 30, (see Figs. 2, 3, and 8,) which are bent and project toward one another and are secured to the side frames $l$ by bolts. They form stops, as hereinafter described. In the modification of the structure shown in Figs. 14 and 15 the end disks $l'$ are provided with companion apertures to receive the yoke-latch 31. This is connected to and on the outside of the end disk by a spring-plate 32, and in connection with this modification a cam-plate 33, Fig. 14, is employed, which cam-plate 33 is advantageously connected to the side frames $l$.

The several car structures are alike, so that the description of one will suffice for all. Each car structure comprises side plates $m$, with open centers joined into a fixed relation by connecting-rods 34. Each car is supported on three wheels. Two wheels 35 run on the rail 2 and one wheel 35 runs on the track-rail 3, and each wheel is provided with a trunnion-yoke 36, passing through bearing-brackets 37. A draft-bar 38 is connected to the forward part of the car and serves either for connection to another car or to the power-beam $e'$.

At the sides of the plates $m$ of the car and spanning the open centers are spider-frames $m'$, in which are longitudinally-movable bearing-blocks $m^2$, each with a face-plate $m^{10}$. Each frame $m'$ is provided with a lug 40, and there is a lug 39 at the upper end of each block $m^2$, movable therewith, and a spring $m^3$ is interposed between the lugs 39 and 40, preferably on a center-pin, which permits a limited motion.

$m^4$ is a cam-bar, and 41 end lugs to the same, the lugs being secured by suitable bolts or lag-screws to and against the outer surfaces of the plates $m$, the cam-bar $m^4$ passing across between the side plates and through the open center of the filling-cylinder $o$, closely adjacent to the inner surface of said cylinder.

$m^5$ is a pressure-roller with bearings in the side plates $m$; $m^6$, a brush-roller also with bearings in the side plates $m$.

$m^7$ is a conveyer device comprising a trough and a conveyer-screw therein, the trough being suitably supported by and in connection with the side plates $m$. This conveyer is appreciably longer than the car. One end of the shaft of the screw of said conveyer is provided with a bearing in one side plate $m$ and the other end with a bearing in a bracket $m^{11}$, secured to the side plate $m$. There is an opening in the bottom of the conveyer-case at its distant or free end with reference to the car, and the upper portion of said conveyer-case between the side plates and for a predetermined distance is open, as shown in Figs. 7 and 16, to receive the extruded tesseræ for their removal. The connecting-rods 34, extending between the side plates $m$, also secure in position the spider-frames $m'$, with the parts connected thereto. The openings in the bottoms of the conveyers of different cars are so placed as to deliver the different colors into different receptacles $t^2$. The spider-frame $m'$ at the inner end of the car may vary in shape from the outer frame $m'$ to receive the bracket 37 of the one inside wheel 35.

Secured to the side plates $m$ are auxiliary side plates $m^8$. These come at the upper portions of the side plates and extend above the same. They are recessed in a part of the upper surface to provide sockets for the friction-rollers $k'$ of the roller or spindle $k$, and these plates are each provided with a cam-post $m^9$, that rises appreciably above the said recessed portions of the plates.

$o$ represents the open-ended filling-cylinder, the respective ends of which are reduced to provide shoulders or offset-bearings fitting in the open centers of the frames $m$, these open centers of the frames $m$ becoming the bearings of the filling-cylinder. At one end of the filling-cylinder $o$ there is an external gear 42. This meshes with a gear 43, which in turn meshes with a pinion 44 on the shaft of the brush-roller $m^6$, (see Fig. 4,) by means of which an acceleration or speed is imparted to the brush-roller greater than that of the parts from which motion is received. The gear 50 also meshes with the gear 42 for communicating rotary movement from the gear 42 to the conveyer $m^7$.

$n$, Figs. 4, 6, and 16, is a pattern-roller, the shaft or axis of which is borne by the bearing-blocks $m^2$, and surrounding the same is a matrix-cylinder $n'$. One end of the pattern-roller carries a gear 45. $n^2$ is a plunger-roller, carrying series of headed plungers $n^3$ at right angles to one another. This roller $n^2$ is within the filling-cylinder $o$ and interposed between the same and the pattern-roller $n$, with end bearings in the bearing-blocks $m^2$. At the end of the plunger-roller $n^2$ there is a gear 46, which meshes both with the gear 45 on the end of the pattern-roller and with an internal gear 47 of the filling-cylinder, and $n^4$ is a guide-plate (see Figs. 4 and 16) interposed between the surface of the filling-cylinder and the sheet of composition material being fed to the filling-cylinder. The part $n'$, styled a "matrix-cylinder," may be a perforated sheet wrapped around the roller $n$ and secured in place and performing all the functions of the cylinder $n'$.

The filling-cylinder $o$ is provided in its outer surface with a series of pattern-die plungers $o'$, received in recesses in the surface of the cylinder, which recesses agree with the configuration of said plunger. These plungers may be given any desired shape or outline, and while some may be square or triangular I prefer to make the same of small triangular outline wherein four of the triangular figures will be required to form a square figure. It will, however, be apparent that the triangular figures may be of such a size that two will form a square figure, four, however, being preferable in forming the square figure, because of the latitude afforded thereby in the formation of designs for the inlaid linoleum.

Each pattern-die plunger is provided with a stem $o^2$, passing radially through the filling-cylinder, the inner end of the stems being beveled, so as to be acted upon in the rotation of the filling-cylinder by the plunger-roller $n^2$ and cam-bar $m^4$. The stems $o^2$ are each provided with a head moving in a recess in the inner surface of the cylinder, and there is a spring 48 between the base of the recess and the under surface of the head, the function of which is to normally keep the plungers $o'$ to their seats in the cylinder. Beneath each plunger $o'$ and secured to the cylinder is a plate $o^3$, provided with pins 49, standing out therefrom and passing through openings in the plungers $o'$ and of a length to protrude beyond the surfaces of the plungers, so as to stick into the composition material forming the tesseræ and impale the same thereon, especially under the action of the pressure-roller $m^5$.

Fig. 16 shows the filling-cylinder, the pressure-roller $m^5$, the brush-roller $m^6$, and the conveyer $m^7$, together with the cutting pattern-plate $c$, of full size. From this it will be apparent that the distance between the centers of the stems $o^2$ agrees exactly with the distance between the centers of the openings in the pattern-plate $c$. The plungers $o'$ extend completely around the operative surface of the filling-cylinder $o$ and along so much of the length of said cylinder as agrees with the width of the pattern-plate $c$, and while I have shown in Figs. 1 and 18 the pattern-plate $c$ as composed of a series of bars at right angles to one another with square openings I have shown in Fig. 17 a rear elevation of the pattern-die plungers $o'$ in larger size, in which it is apparent that four of these plungers are necessary for every square piece of tessera cut to fill the openings in the pattern-plate $c$.

The pattern-roller $n$ is provided both circumferentially and longitudinally with a series of openings spaced apart accurately and circumferentially agreeing in number as well as longitudinally with the number of plungers $o'$, arranged circumferentially and longitudinally of the filling-cylinder, and the matrix-cylinder $n'$, that closely surrounds the pattern-roller $n$, is provided with openings coinciding with the openings of the pattern-cylinder, but formed at places only which agree with the pattern required of a given color. The plungers $n^3$ in the plunger-roller $n^2$ also agree in number with the number of the plungers $o'$ of the filling-cylinder, and they are controlled by this matrix-cylinder $n'$, as by reference to Fig. 16 it will be noticed that one head of the vertical plunger is against the surface of the matrix-cylinder, and because there is no opening at this point for the head to enter the same at the other end has forced the stem $o^2$, with the plunger $o'$, outward and has forced a portion of the composition material $x^4$ out into an opening in the cutting pattern-plate $c$, and so formed a tessera. Upon the inner surface of one side frame $m$ of the car there is a part carrying a pin $r$, (see Figs. 4, 5, and $2^a$,) the function of which will be hereinafter described.

In the modification shown in Fig. 13, $s$ represents a guide over the stem $s'$ of the roller 35. This guide is secured to the outer surface of the plate $m$. The upper end of the stem $s'$ is reduced, forming the portion $s^2$. The reduced end is provided with an external thread in one direction, while the upper end of the stem $s'$, adjacent thereto, is provided with a thread in the opposite direction. $s^3$ is a sleeve surrounding the upper reduced end of the stem and interiorly threaded to mesh with the threads of the reduced portion of the stem, and this sleeve $s^3$ passes through a bracket $s^4$, in which it turns, and there is a lock-nut $s^5$ below the sleeve $s^3$ on the threaded upper end of the stem $s'$. This device provides for adjusting the relation of the car and parts associated therewith to the pattern-plate $c$, and in effecting this adjustment the lock-nut $s^5$ is loosened, the sleeve $s^3$ is turned to move the stem longitudinally, and so raise and lower the car, and when the right position is determined the lock-nut $s^5$ is brought tightly against the lower end of the sleeve $s^3$, so as to fix the relation of the parts and prevent any accidental movement, the wheel 35 thereof as the car runs on the track turning with its stem and the sleeve $s^3$ in the bracket $s^4$.

In Figs. 20 and 21 I have shown modifications of the pattern-plate $c$, from which it will be apparent that the pieces of tesseræ instead of being square, as will be the case with the plate, Fig. 18, may be triangular, it requiring two triangular pieces, Fig. 20, to form a square piece and four triangular pieces, Fig. 21, to form a square piece or figure.

The operation of the device is as follows: The racks $b$ of the platforms $a$ engaging the teeth 42 of the filling-cylinder cause the rotation of the same and also effect the rotation of the brush-roller and the conveyer, while the pins $b'$, which are practical continuations of the racks and extend around the connecting-platforms between the working platforms continue this rotary movement, insure the delivery of all the tesseræ that may remain unused on the filling-cylinder after it has passed the end of the plate $c$, and insure the filling-cylinder coming to the right point of registry with the edge of each cutting pattern-plate with the movement of the car or cars as drawn along on the track. As the first car approaches the edge of the cutting pattern-plate the auxiliary plate $m^8$ and its base $m^9$ come between the side frames $i$ of the storage for rolls of composition material. The advancing surfaces of the cam-posts $m^9$ come against the friction-rollers $k'$ of the roller or spool $k$ and with the further movement of the car force the said spindle out of the springs $i^3$ and carry the same forward, the gears $k^2$ meshing with the teeth of the racks $i^7$ as the said spindle, with its roll of composition material, descends the said inclined racks. As the same reaches the ends of the inclined racks the friction-rollers of the spindle rest in the recesses of the frames $m^8$, and about the same time the said spindle strikes the latches $i^6$, swinging the same, operating all the cords $i^5$, withdrawing all of the spring-catches $i^4$, and causing the superimposed spindles and rolls of composition material in the storage for rolls to drop down one position—that is, the lowermost roll falls into the position from which a roll has just been taken, and the next roll falls into the first elevated position against the latches $i^6$, which by their springs have been returned to position—and in this way the several latches spring back as each roll of composition material is removed from the holder, the movement being momentary and sufficiently quick to catch the falling rolls. As the spindle and roll engaged move down the rack the material unwinds. It moves over the surface of the guide-plate $n^4$ and surface of the filling-cylinder, and its end is caught by the pressure-roller $m^5$, and the same is pressed upon the pins 49 of the filling-cylinder, the rotary movement of which cylinder as a wheel with the advancing movement of the car unwinds the composition material from its spindle, impaling the same upon said pins and causing it in its plastic condition to follow around the contour of the filling-cylinder. Fig. 16 shows the act of cutting the tesseræ, in which, as hereinbefore described, the filling-cylinder, the plunger-roller, and the pattern-roller all move in unison and are so timed that in a vertical plane below the center of the pattern-roller a stem $o^2$ of a die-plunger, a plunger $n^3$, and a recess of the pattern-roller are always in line. The pattern-roller is set eccentric to the filling-cylinder, as will be apparent from this figure, and a quarter circumference of the plunger-roller $n^2$ between the centers of any of the plungers agrees with the distance between the centers of the recesses of the pattern-roller $n$ and also between the centers of the stems $o^2$ of the plungers in order to bring this condition maintained in the vertical plane always into effect. As in Fig. 16, where there is no opening in the pattern-roller, the plunger $n^3$ presses down the stem $o^2$ and forces the plunger $o'$ down into the pattern-plate $c$, pressing the composition into the pattern-plate and cutting the same, because of the cutting function performed by the said pattern-plate, and at the same time pressing the composition piece which thus is made a tessera into the pattern-plate and upon the surface of the fabric. Where there is an opening in the matrix-cylinder $n'$ which agrees with the recess in the pattern-roller, then the plunger is moved through this opening into this recess, when the same comes in contact with the projecting stem $o^2$ of the plunger, and in this connection the stem and plunger are not moved. Consequently the piece of composition material impaled upon the surface of the plunger not operated is carried on past the point of delivery and becomes for the time being waste material. Fig. 16 also shows these pieces of waste material as being brushed off the surface of the plungers $o'$ into the trough of the conveyer $m^7$. This is effected by the action of the cam-bar $m^4$, which progressively forces all the plungers outward, withdrawing the pins 49 from the composition material, and so extruding the same from the surface of the filling-cylinder, the rapidly-moving brush-roller $m^6$ brushing them away into the trough of the conveyer. The rotary movement of the conveyer-screw moves these pieces of waste tesseræ or composition material toward the outer free end, where they fall through an opening, such as shown in Fig. 6, and are collected by receptacles $t^2$ in their path, so as to be returned to the source of original supply to be reformed into sheets.

The rolls of composition material in the storage device between the side frames $i$ are preferably of different and alternating colors. If a single car is used, the rolls will be of the same color. If two cars are used, as in Fig. 1, the rolls will preferably be of different colors. Alternating the first car takes one color and the second car another color, and as each car carries its own conveyer for delivering the waste pieces and the receptacles $t^2$ are arranged to receive only one color each there is no risk of the colors of the waste material mixing. Each car carries its peculiar matrix-cylinder $n'$ to control the pattern of pieces of tesseræ laid into the pattern-plate $c$, and while the first car in the operation thereof might carry composition material of one color and lay in the pattern of that color complete for a width of a section of material the next car following would fill up the intervening spaces left in the pattern-plate with a second color, so as to completely fill in spaces of the pattern-plates, so that the fabric may be shifted between each car or group of cars. Each car may be provided with a pin $r$, and where two or more cars are used the pin $r$ of the last car is brought into position for operation, and it will be apparent from Fig. 4 that the construction of this pin $r$ and its plate is such that it may be swung up out of the way when it is not required for the performance of its office.

The pattern-plates shown in Fig. 1 are approximately eighteen inches wide and six feet long. The fabric is slightly in excess of six feet wide in rolls. Therefore a strip of six feet wide, or the width of the fabric, and eighteen inches along the fabric is laid with tesseræ each time, and the composition material carried by each spindle is therefore fully eighteen inches wide and six feet long rolled around the spindle. In the further movement of the car and as the same comes toward the left hand of Fig. 1 of the pattern-plate the spool or spindle $k$ has been relieved of composition material and is therefore empty, the ends thereof projecting beyond the surfaces of the plates $m^8$. These ends with the forward movement strike the lowest spring-latches $l^6$ of the receptacle for empty spools, raise the same, and pass into the U-shaped receptacles $l^4$, the latches returning behind the ends of the spindles and holding them in position. With the further movement of the car the cam-posts $m^9$ bear against the inclined bracket-lugs $l^7$ and commence a rotary movement of the entire receptacle for empty spools on the shaft $l^2$ in the side frames $l$. This movement is maintained for a quarter of a revolution and until the lowermost edge of said bracket-lugs $l^7$ comes just high enough for the upper end of the cam-posts $m^9$ to pass beneath and free of the same. This leaves the empty spool in position. When the next empty spool is similarly engaged and turned from the lower position to a similar elevated position, the previous empty spool has been raised to the highest position, (see Fig. 8,) during which the projecting ends or arms $l^{10}$ of the spring-latch $l^6$ have underrun the cams $l^3$, so that the latches have been gradually depressed. In this movement the pivoted ends $l^9$ of the platform have been raised by the empty spindle or spool and as the same has passed by the pivoted ends of the ways have returned to position, and when the said empty spool reaches the highest point the bracket-arms 30, acting as stops, prevent further movement of the empty spool, and as the latches have been withdrawn and the same is free the empty spool is forced forward onto the inclined ways $l^9$ and $l^8$, down which the same is delivered.

With the further movement of the rotary receptacle for empty spools the latch devices $l^6$ return to their normal position ready to receive further empty spools. As the car or last car of the series of cars employed reaches the left-hand end of its movement in cutting tesseræ and filling in the spaces of the pattern-plate the pin $r$ comes against a segment-block $c^6$ of the gear 14, turning said gear a quarter-revolution. This movement rotates the pinion 15, shaft 17, and the gear 16. The pinion 15 in ratio to the gear 14 is as four to one. Consequently one-quarter revolution of the gear 14 will turn the gear 16 one complete revolution. The arrows show the direction of rotation, and Figs. 2 and $2^a$ illustrate the parts at their initial position. As the gear 16 turns from the position Fig. 2 in the direction of the arrow one-half of its toothed surface turns the gear $f^{10}$, sprocket $f^3$ rotating the shaft $f$ and operating the eccentrics $f'$ $f^2$. The operation of the eccentric $f^2$ and the parts associated therewith swings the bell-crank lever $f^6$ and withdraws the locking-pin $f^8$ from the roller $g$. The operation of the eccentric $f'$ raises the beam $c^5$, cross-beams $c^4$, arms $c^3$, the side frames $c'$, and the cutting pattern-plate $c$, raising said plate $c$ completely above the sheet of fabric and the tesseræ laid thereon, permitting the counterweight $e^5$ to swing down from the vertical position and assist the movement of the aforesaid parts by its weight. With this movement and in the direction of the arrow the teeth of the gear 16 pass free of the gear $f^{10}$, leaving the parts in the position to which they have just been brought. The teeth of the gear 16 now come into engagement with the teeth of the gear 18, turning the shaft 19, the bevel-gears $c^7$, the gears 21, 22, and 23 rotating the shaft 24 and roller $g$ and by means of the connecting-rod 27 also rotating the disk 26, shaft 25, and roller $g'$, imparting to the rollers $g$ $g'$ one complete revolution. These rollers are to be eighteen inches in circumference. Consequently one rotation agrees exactly with the exposed surface of fabric upon which tesseræ has been placed, so that so much is removed over the roller $g$ and a new eighteen-inch surface brought into exact position. This movement stops when the teeth of the gear 16 run off the teeth of the gear 18, and as the teeth of the gear 16 again mesh with the teeth of the gear $f^{10}$ and one-half of said teeth come into evidence to turn said gear $f^{10}$ the eccentrics $f'$ and $f^2$ are again operated, as hereinbefore described. The locking-pin $f^8$ is again brought into its recess in the roller $g$ to hold the same, and the parts operated by the eccentric $f'$ are drawn down and return the pattern-plate $c'$ to its initial position against the fresh surface of fabric, ready for relaying the tesseræ therein with the further movement of the advancing car or cars in the manner hereinbefore described. With these movements the weight $e^5$ is again brought to an elevated position.

In the operation of the modification shown in Figs. 14 and 15 of the receptacle for empty spools it will be noticed that the yoke-latch 31 has an inclined portion and a square-ended portion. The inclined portion comes behind the end of the spindle to hold the same in the U-shaped receptacles $l^4$. The yoke-latch 31 as said receptacle is turned in the manner hereinbefore described comes against the cam-plate 33 at its squared end and the same is pressed outward, thus releasing the spindle from the inclined end of said yoke-latch and freeing the same, so that it may be removed and delivered upon the ways $l^8 \, l^9$.

From the foregoing description it will be apparent that the filling-cylinder is drawn over the tables, that the pattern-plates are stationary, that all the register that is required is between the plungers of the filling-cylinder and the pattern-plate which is automatically effected by the gears. It will be further apparent that a strip of eighteen inches in width is laid upon the fabric or linoleum foundation for the full width of the foundation and that therefore the linoleum is progressively laid its full width in a step-by-step operation where the sections are approximately eighteen inches wide, and that this laying is done directly upon the canvas or fabric foundation. It will be further apparent that a single color or several colors may be applied progressively and that several strips of linoleum material may be simultaneously made of the same pattern, but a different color effect. It will be further apparent that with the same filling-cylinder pattern-plates that have square or triangular form may be filled with equal facility and that according to the pattern to be produced and which is controlled by the matrix-cylinder $n'$ and pattern-roller $n$ so small or large triangular pieces of tesseræ may be cut to fill the pattern-plate.

I have shown in Fig. 24 a spring $n$, carried by a support $n'$ and having a projection or pin 50, engaging a vertical groove in the face of the counterbalance-weight $e^5$ when in a vertical position for assisting in holding this weight in such normal position.

I claim as my invention—

1. In a machine for the manufacture of linoleum, a platform, a horizontally-disposed cutting pattern-plate in length equal to the width of the fabric and in width a section lengthwise of the fabric and the parts of which are in an even flat plane lying directly upon the strip of fabric.

2. In a machine for the manufacture of linoleum, a platform, a horizontally-disposed cutting pattern-plate in length equal to the width of the fabric and in width a section lengthwise of the fabric and the parts of which are in an even flat plane normally lying directly upon the strip of fabric, and means for raising said plate bodily for a predetermined distance and for lowering the same.

3. In a machine for the manufacture of linoleum, a platform, a horizontally-disposed cutting pattern-plate in length equal to the width of the fabric and in width a section lengthwise of the fabric and the parts of which are in an even flat plane normally lying directly upon the strip of fabric, means for raising said plate bodily for a predetermined distance and for lowering the same, and means for moving the fabric and impressed tesseræ along and beneath the pattern-plate when raised, a distance equal to just the width of said plate.

4. In a machine for the manufacture of linoleum, a platform arranged as four sides of a square figure with connecting corners, and a series of horizontally-disposed cutting pattern-plates laid lengthwise of each side.

5. In a machine for the manufacture of linoleum, a platform arranged as four sides of a square figure with connecting corners, a series of horizontally-disposed cutting pattern-plates laid lengthwise of each side, and means for raising the said pattern-plates bodily for a predetermined distance and for lowering the same.

6. In a machine for the manufacture of linoleum, a platform arranged as four sides of a square figure with connecting corners, and a series of horizontally-disposed cutting pattern-plates laid lengthwise of each side, and rollers for fabric parallel with and at opposite edges of the respective sides of the platform, and means for actuating said rollers and moving said fabric.

7. In a machine for the manufacture of linoleum, a platform arranged as four sides of a square figure with connecting corners, a series of horizontally-disposed cutting pattern-plates laid lengthwise of each side, rollers for fabric parallel with and at opposite edges of the respective sides of the platform, means for actuating said rollers and moving said fabric, and means timed with the coöperation of the aforesaid devices for raising the said pattern-plates bodily for a predetermined distance above the surface of the fabric and for thereafter lowering the same.

8. In a machine for the manufacture of linoleum, a platform arranged as four sides of a square figure with connecting corners, a continuous track upon said platforms and corners, gears in connected series also upon said platforms cars adapted to run on said track and carrying the composition material to be employed in said manufacture, and means for operating said cars.

9. In a machine for the manufacture of linoleum, a platform arranged as four sides of a square figure with connecting corners, a series of horizontally-disposed cutting pattern-plates each laid lengthwise of the said sides, a track on said platforms, rollers at opposite sides of said platforms for fabric, cars upon said track and devices actuated by the movement of said cars, and devices interposed between the same and the fabric-rollers and cutting-plates and actuated thereby for effecting the movement of the cutting-plates and shifting the fabric.

10. In a machine for the manufacture of linoleum, and in combination, a platform having a track, a car adapted to run on said track, a rack, devices carried by the car for supporting composition material and for engaging said rack, rollers at opposite sides of said platform for fabric to be drawn across said platform, a horizontally-disposed cutting pattern-plate in length agreeing with the width of the fabric, devices for raising and lowering said pattern-plate, devices for shifting the fabric coacting and timed with relation to one another, and a device carried by the car for simultaneously effecting the operation of the aforesaid devices.

11. In a machine for the manufacture of linoleum, and in combination, a horizontally-disposed platform, a track upon said platform, a car adapted to run upon said track, devices carried by said car for cutting tesseræ from composition material, a gear on said platform engaging the devices of the car for effecting their operation, a device at the beginning of said platform for the storage of rolls of composition material, and means for delivering a roll at a time to the car.

12. In a machine for the manufacture of linoleum and in combination, a horizontally-disposed platform, a track upon said platform, a car adapted to run upon said track, devices carried by said car for cutting tesseræ from composition material, a gear on said platform engaging the devices of the car for effecting their operation, a device at the end of the platform as a receptacle for empty spools, and means for removing the empty spools from the car to said device.

13. In a machine for the manufacture of linoleum and in combination, a horizontally-disposed platform, a track upon said platform, a car adapted to run upon said track, devices carried by said car for cutting tesseræ from composition material, a gear on said platform engaging the devices of the car for effecting their operation, a device at the beginning of said platform for the storage of rolls of composition material, means for delivering a roll at a time to the car, a device at the end of the platform as a receptacle for empty spools, and means for removing the empty spools from the car to said device.

14. In a machine for the manufacture of linoleum and in combination, a platform, a track upon the platform, a horizontally-disposed cutting pattern-plate, a car adapted to run over said platform on said track, and including a filling-cylinder, die pattern-plungers carried by said cylinder and means for operating the same, a pressure-roller, a brush-roller and a conveyer for discharging waste pieces of tesseræ.

15. In a machine for the manufacture of linoleum and in combination, a platform, a track upon the platform, a horizontally-disposed cutting pattern-plate, a car adapted to run over said platform on said track and including a filling-cylinder, die pattern-plungers carried by said cylinder, means for operating the same, a pressure-roller, a brush-roller and a conveyer for discharging waste pieces of tesseræ, a rack on the platform, a gear meshing therewith, and coacting gears for effecting the operations of the various parts.

16. In a machine for the manufacture of linoleum, and in combination, a platform, a track upon the platform, a horizontally-disposed cutting pattern-plate, a car adapted to run over said platform on said track and including a filling-cylinder, die pattern-plungers carried by said cylinder, means for operating the same, a pressure-roller, a brush-roller, and a conveyer for discharging waste pieces of tesseræ, a rack on the platform, a gear meshing therewith, coacting gears for effecting the operations of the various parts, and a cam-bar actuating the pattern die-plungers for extruding the waste tesseræ.

17. In a machine for the manufacture of linoleum, the combination with a platform, a track thereon and a car adapted to be drawn over the track, of a device for the storage of rolls of composition material comprising side frames and supports therefor, the inner surfaces of which are formed with grooved ways, inclined racks at the lower ends of said side frames, cases and spring-catches therein on the inner surfaces of said side frames at spaced-apart intervals, latches on the inner surfaces of said frames adjacent to the inclined racks, cords from the latches to the several spring-catches, and rollers or spools for the composition material received between the said side frames in said grooves and supported by said catches and by said inclined rack, substantially as set forth.

18. In a machine for the manufacture of linoleum, the combination with a platform, a track thereon and a car adapted to be drawn over the track, of a device for the storage of rolls of composition material, comprising side frames and supports therefor, the inner surfaces of which are formed with grooved ways, inclined racks at the lower ends of said side frames, cases and spring-catches therein on the inner surfaces of said side frames at spaced-apart intervals, latches on the inner surfaces of said frames adjacent to the inclined racks, cords from the latches to the several spring-catches, rollers or spools for the composition material received between the said side frames in said grooves and supported by said catches and by said inclined rack, devices connected to said cars and moving therewith and serving as supports for one roller at a time carrying composition material and said devices, adapted with the movement of the car for picking up a roller at a time and for effecting the operation of the associated devices for shifting the superimposed rolls of composition material in said receptacle.

19. In a machine for the manufacture of linoleum, the combination with a platform, a track thereon and a car adapted to be drawn over the track, of a device for the storage of rolls of composition material comprising side frames and supports therefor, the inner surfaces of which are formed with grooved ways, inclined racks at the lower ends of said side frames, cases and spring-catches therein on the inner surfaces of said side frames at spaced-apart intervals, latches on the inner surfaces of said frames adjacent to the inclined racks, cords from the latches to the several spring-catches, rollers or spools for the composition material received between the said side frames in said grooves and supported by said catches and by said inclined rack, auxiliary plates secured to the plates of the car and rising above the same and each having a recessed portion and a cam-post serving as supports for a roller at a time of the composition material and adapted with the movement of the car for picking up a roller at a time and for effecting the operation of the associated devices for shifting the superimposed rolls of composition material in said receptacle.

20. In a machine for the manufacture of linoleum and in combination, a platform, a track upon the platform, a car adapted to move on said track, a horizontally-disposed cutting pattern-plate also upon said platform and over which the car moves, an open-ended filling-cylinder with offset reduced ends bearing in open centers formed in the side frames of the car, a pattern-roller and matrix-cylinder coacting and within the filling-cylinder, a plunger-roller intermediate of the pattern-roller and filling-cylinder, a gear on the platform for turning the filling-cylinder as the carriage is drawn along, connecting-gears for turning the pattern-roller and the plunger-roller in unison with the filling-cylinder.

21. In a machine for the manufacture of linoleum and in combination, a platform, a track upon the platform, a car adapted to move on said track, a horizontally-disposed cutting pattern-plate also upon said platform and over which the car moves, an open-ended filling-cylinder with offset reduced ends bearing in open centers formed in the side frames of the car, a pattern-roller and matrix-cylinder coacting and within the filling-cylinder, a plunger-roller intermediate of the pattern-roller and filling-cylinder, a gear on the platform for turning the filling-cylinder as the carriage is drawn along, connecting-gears for turning the pattern-roller and the plunger-roller in unison with the filling-cylinder, and a cam-bar passing through the filling-cylinder and between the same and the pattern-roller and performing the office of extruding the waste pieces of tesseræ.

22. In a machine for the manufacture of linoleum, and in combination, a platform, a track upon the platform, a car adapted to move on said track, a horizontally-disposed cutting pattern-plate also upon said platform and over which the car moves, an open-ended filling-cylinder with offset reduced ends bearing in open centers of the frames of the car, a gear on one end of the same meshing with said rack for its rotation, a series of circumferentially and longitudinally arranged triangular pattern-die plungers connected to said filling-cylinder, plates at the bases of said plungers with pins connected thereto passing through said plungers and projecting, stems to said plungers arranged radially of the filling-cylinder and passing through recesses in the inner surface of the said cylinder, heads upon said stems and springs in the recesses between the cylinder and said heads, means for pressing the composition material against the surfaces of said plungers and impaling the same on the pins, and means for operating the said plungers.

23. In a machine for the manufacture of linoleum, and in combination, a platform, a track upon the platform, a car adapted to move on said track, a horizontally-disposed cutting pattern-plate also upon said platform and over which the car moves, an open-ended filling-cylinder with offset reduced ends bearing in open centers of the frames of the car, a gear on one end of the same meshing with said rack for its rotation, a series of circumferentially and longitudinally arranged triangular pattern-die plungers connected to said filling-cylinder, plates at the bases of said plungers with pins connected thereto passing through said plungers and projecting, stems to said plungers arranged radially of the filling-cylinder and passing through recesses in the inner surface of the said cylinder, heads upon said stems and springs in the recesses between the cylinder and said heads, a roller for pressing the composition material against the faces of said plungers and impaling the same upon said pins, a pattern-roller within the filling-cylinder having a series of circumferentially and longitudinally arranged recesses agreeing in number with the number of the plungers of the filling-cylinder, a matrix-cylinder surrounding the pattern-roller and having apertures coinciding with the recesses of the pattern-roller, according to the pattern to be produced, a plunger-roller interposed between the pattern-roller and the inner surface of the filling-cylinder and having headed plungers in series at right angles to one another, the operation of which is controlled by the matrix-cylinder for effecting the operation of the pattern-die plungers, substantially as set forth.

24. In a machine for the manufacture of linoleum, and in combination, a platform, a track upon the platform, a car adapted to move on said track, a horizontally-disposed cutting pattern-plate also upon said platform and over which the car moves, an open-ended filling-cylinder with offset reduced ends bearing in open centers of the frames of the car, a gear on one end of the same meshing with said rack for its rotation, a series of circumferentially and longitudinally arranged triangular pattern-die plungers connected to said filling-cylinder, plates at the bases of said plungers with pins connected thereto passing through said plungers and projecting, stems to said plungers arranged radially of the filling-cylinder and passing through recesses in the inner surface of the said cylinder, heads upon said stems and springs in the recesses between the cylinder and said heads, a roller for pressing the composition material against the faces of said plungers and impaling the same upon said pins, a pattern-roller within the filling-cylinder having a series of circumferentially and longitudinally arranged recesses agreeing in number with the number of the plungers of the filling-cylinder, a matrix-cylinder surrounding the pattern-roller and having apertures coinciding with the recesses of the pattern-roller, according to the pattern to be produced, a plunger-roller interposed between the pattern-roller and the inner surface of the filling-cylinders and having headed plungers in series at right angles to one another, the operation of which is controlled by the matrix-cylinder for effecting the operation of the pattern-die plungers, a cam-bar for operating the plungers and extruding the waste pieces of tesseræ, a brush-roller for removing the same, and a conveyer for receiving and delivering the pieces outside of the car.

25. In a machine for the manufacture of linoleum, the combination with a platform, a track, a car movable over the surface of the platform and devices carried by the car for supporting a roll or spindle of composition material, of a receptacle for empty spools, comprising a series of equidistant circularly-arranged receptacles for receiving the ends of the spool-spindles, a series of coacting devices for retaining them in position, a device upon and moving with the car for imparting progressive rotary movements to said receptacle for empty spools, a stationary device acting upon the device for holding the spindles in place and for releasing the same for the delivery of the empty spools.

26. In a machine for the manufacture of linoleum, the combination with a platform, a track, a car movable over the surface of the platform and devices carried by the car for supporting a roll or spindle of composition material, of a receptacle for empty spools, comprising disks upon a shaft in bearings in a common support, a series of U-shaped receptacles between said disks and at spaced-apart intervals, a series of latch devices adjacent to said receptacles, a device on the car for advancing the empty spools into said receptacles in which movement the latch devices yield and then return to hold the spindles, a series of devices connected to said disks and associated with said receptacles and latch devices and also acted upon by the device carried by the car for imparting a quarter-revolution to the receptacle for empty spools.

27. In a machine for the manufacture of linoleum, the combination with the side supporting-frames $l$, of disks $l'$, a shaft to which they are connected and which shaft is pivoted in said frames, pawl devices engaging peripheral notches of said disks for holding said disks at predetermined points, a series of U-shaped receptacles connected to the inner surface of said disks at opposite points and adapted to receive the ends of empty spool-spindles, coacting latch devices adapted to hold said spool-spindles in said receptacles, inclined bracket-lugs associated with said receptacles and latch devices, means for delivering the empty spools to said receptacles and for simultaneously engaging said bracket-lugs to effect a quarter-revolution of the receptacle for empty spools, substantially as set forth.

28. In a machine for the manufacture of linoleum, the combination with the side supporting-frames $l$, of disks $l'$, a shaft to which they are connected and which shaft is pivoted in said frames, pawl devices engaging peripheral notches of said disks for holding said disks at predetermined points, a series of U-shaped receptacles connected to the inner surfaces of said disks at opposite points and adapted to receive the ends of empty spool-spindles, coacting latch devices adapted to hold said spool-spindles in said receptacles, inclined bracket-lugs associated with said receptacles and latch devices, means for delivering the empty spools to said receptacles and for simultaneously engaging said bracket-lugs to effect a quarter-revolution of the receptacle for empty spools, cams for engaging projected portions of said latch devices, an inclined platform and stationary bracket-arms for removing the spool-spindles from the receptacles, and an inclined platform upon which the same are delivered.

29. In a machine for the manufacture of linoleum, the combination with a cutting pattern-plate in a flat plane, of a movable support, a filling-cylinder carried thereby and a series of circumferentially and longitudinally arranged pattern-die plungers connected to the filling-cylinder.

30. In a machine for the manufacture of linoleum, the combination with a cutting pattern-plate in a flat plane, of a movable support, a filling-cylinder carried thereby and a series of circumferentially and longitudinally arranged pattern-die plungers connected to the said filling-cylinder, a roll of composition material, impaling devices and means for pressing the composition material thereon, the filling-cylinder moving over the cutting pattern-plate for cutting the composition material into tesseræ.

31. In a machine for the manufacture of linoleum, the combination with a cutting pattern-plate in a flat plane, of a movable support, a filling-cylinder carried thereby and a series of circumferentially and longitudinally arranged pattern-die plungers connected to the said filling-cylinder, a roll of composition material, impaling devices, means for pressing the composition material thereon, the filling-cylinder moving over the cutting pattern-plate for cutting the composition material into tesseræ, and devices acting upon the die-plungers for releasing the waste tesseræ and means for removing the same.

32. In a machine for the manufacture of linoleum, the combination with a cutting pattern-plate in a flat plane, of a movable support or car, a filling-cylinder carried thereby, a series of circumferentially and longitudinally arranged pattern-die plungers connected to said filling-cylinder and each plunger in turn being of small triangular form, there being four of such plungers arranged with their longer sides forming a square figure.

33. In a machine for the manufacture of linoleum, the combination with a cutting pattern-plate in a flat plane, of a movable support or car, a filling-cylinder carried thereby, a series of circumferentially and longitudinally arranged pattern-die plungers connected to said filling-cylinder and each plunger in turn being of small triangular form, there being four of such plungers arranged with their longer sides forming a square figure, a spring-actuated stem connected to each of said plungers and extending radially through the filling-cylinder, a plate at the base of each of said plungers and pins projecting therefrom through the plungers and beyond.

34. In a machine for the manufacture of linoleum, the combination with a cutting pattern-plate in a flat plane, of a movable support or car, a filling-cylinder carried thereby, a series of circumferentially and longitudinally arranged pattern-die plungers connected to said filling-cylinder, each plunger in turn being of small triangular form, there being four of such plungers arranged with their longer sides forming a square figure, a spring-actuated stem connected to each of said plungers and extending radially through the filling-cylinders, a plate at the base of each of said plungers, pins projecting therefrom through the plungers and beyond, a device for impaling composition material upon said projecting pins against the surfaces of said plungers, and means for acting upon the spring-actuated plunger-stems according to the pattern to be produced.

35. In a machine for the manufacture of linoleum, the combination with a cutting pattern-plate in a flat plane, of a support or car movable across the said pattern-plate, a hollow open-ended filling-cylinder carried by said support or car, a pattern-roller and surrounding matrix-cylinder passing through the filling-cylinder with the axis thereof set eccentric to the filling-cylinder, a plunger-roller interposed between the outer surface of the matrix-cylinder and the inner surface of the filling-cylinder and coöperating with the respective parts for producing the pattern.

36. In a machine for the manufacture of linoleum, the combination with a cutting pattern-plate in a flat plane, of a support or car movable across the said pattern-plate, a hollow open-ended filling-cylinder carried by said support or car, a pattern-roller and surrounding matrix-cylinder passing through the filling-cylinder with the axis thereof set eccentric to the filling-cylinder, a plunger-roller interposed between the outer surface of the matrix-cylinder and the inner surfaces of the filling-cylinder, a series of circumferentially and longitudinally arranged pattern-die plungers connected to the said filling-cylinder, a series of headed plungers passing through the plunger-roller at right angles to one another, the said parts being so arranged, connected and timed as to coöperate for the production of the predetermined pattern.

37. In a machine for the manufacture of linoleum, the combination with a fixed cutting pattern-plate, of a filling-cylinder and means for turning the same along over said plate.

38. In a machine for the manufacture of linoleum, the combination with a fixed cutting pattern-plate, of a filling-cylinder, means for turning the same along over said plate, and devices actuated thereby for cutting tesseræ from a strip of composition material.

39. In a machine for the manufacture of linoleum, the combination with a fixed cutting pattern-plate, of a series of following filling-cylinders and devices connected therewith for carrying composition material in different colors, devices for turning the cylinders along over said plate and coöperating devices for cutting the materials into tesseræ and progressively building up the pattern and filling the pattern-plate.

Signed by me this 16th day of November, 1903.

HENRY VAN COTT HOLLAND.

Witnesses:
GEO. T. PINCKNEY,
S. T. HAVILAND.